(12) United States Patent
Nakamura

(10) Patent No.: US 7,374,289 B2
(45) Date of Patent: May 20, 2008

(54) PROJECTION TYPE VIDEO DISPLAY

(75) Inventor: Hisashi Nakamura, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 169 days.

(21) Appl. No.: 11/229,532

(22) Filed: Sep. 20, 2005

(65) Prior Publication Data

US 2006/0066815 A1    Mar. 30, 2006

(30) Foreign Application Priority Data

Sep. 24, 2004   (JP)   ............................. 2004-278503

(51) Int. Cl.
 *G03B 21/16* (2006.01)
 *G03B 21/18* (2006.01)
(52) U.S. Cl. ..................... 353/52; 353/54; 353/57; 353/88
(58) Field of Classification Search ............. 353/52, 353/54, 57, 58, 88
See application file for complete search history.

(56) References Cited

U.S. PATENT DOCUMENTS

| | | | |
|---|---|---|---|
| 3,205,766 A * | 9/1965 | Ewald et al. ............. | 353/69 |
| 7,055,965 B2 * | 6/2006 | Koba ....................... | 353/88 |
| 7,207,679 B2 * | 4/2007 | Totani et al. ............. | 353/97 |

FOREIGN PATENT DOCUMENTS

| | | |
|---|---|---|
| CN | 1484780 A | 3/2004 |
| JP | 04-147291 A | 5/1992 |
| JP | 2001-174910 A | 6/2001 |
| JP | 2002-365607 | 12/2002 |
| JP | 2002-372747 A | 12/2002 |
| WO | WO 03032080 | 4/2003 |

OTHER PUBLICATIONS

European Search Report dated Jan. 3, 2006, issued in corresponding European Application No. 05020844.6.
Chinese Office Action dated Nov. 16, 2007, Application No. 200510098496.1

* cited by examiner

*Primary Examiner*—Christopher Mahoney
(74) *Attorney, Agent, or Firm*—Westerman, Hattori, Daniels & Adrian, LLP.

(57) ABSTRACT

A shutter device can switch between a state where illuminating light from a lamp of an illuminating device is blocked (referred to as a closing state of the shutter device) and a state where illuminating light passes through (referred to as an opening state of the shutter device). A system control circuit instructs a panel cooling fan-use power source to decrease a fan rotation speed, when receiving information indicating that the shutter device is in the closing state from the detecting portion. After receiving this instruction, the panel fan power source decreases power supplied to the panel cooling fan (fan motor).

6 Claims, 4 Drawing Sheets

(1) LIQUID CRYSTAL DISPLAY PANEL
(2) LIQUID CRYSTAL DISPLAY PANEL
(3) LIQUID CRYSTAL DISPLAY PANEL

PROJECTION TYPE VIDEO DISPLAY

BACKGROUND OF THE INVENTION

Field of the Invention

The present invention relates to a projection type video display such as a liquid crystal projector, and the like.

One of methods of utilizing the liquid crystal projector is to receive a video signal output from a personal computer and to project an image. That is, when a person who makes a presentation operates a personal computer and displays the image that the person intends participants of the presentation to see on a display of the personal computer, the same image as the above-described image is projected on a screen by the liquid crystal projector, so that all the participants can see the image. On the other hand, in some cases, the person who makes a presentation may not wish to show all the images which appear in the course of operating the computer to the participants. It is noted that there is a liquid crystal projector equipped with a shutter on a light-emission side of a light source (see Japanese Patent Application Laying-open No. 2002-365607).

SUMMARY OF THE INVENTION

In response to a request for not projecting any image while a lamp is being turned on, it is conceivable to provide a mechanical shutter device for cutting off light from the lamp. However, in a case where the light from the lamp is cut off by the shutter device, the light is not guided to a liquid crystal display panel. Therefore, in a configuration in which the liquid crystal display panel is cooled, the liquid crystal display panel is cooled excessively when the shutter is closed. Accordingly, it is expected that durability of the liquid crystal display panel will be decreased.

In view of the above-described circumstances, it is an object of the present invention to provide a projection type video display capable of restraining an excessive cooling of a light valve caused by closing a shutter device in a configuration in which a light valve is cooled so as to prevent a decrease in durability of the light valve.

In order to solve the above-described problems, a projection type video display according to the present invention is a projection type video display that optically modulates light emitted from a light source by a light valve and projects image light and comprises a shutter device that opens and closes mechanically and blocks the light in a closing state, a shutter information output portion for outputting opening and closing information of the shutter device, a cooling means for air-cooling or liquid-cooling the light valve, and a cooling control means for controlling the cooling means so as to decrease cooling power for the light valve, when receiving information indicating that the shutter device is in a closing state from the shutter information output portion.

With the above-described configuration, cooling power for the light valve is decreased in a state where the shutter device is closed. Therefore, it is possible to restrain an excessive cooling of a light valve caused by closing a shutter device in a configuration in which a light valve is cooled so as to prevent a decrease in durability of the light valve.

A projection type video display according to the above-described configuration may comprise an integrator lens formed of a pair of fly's eye lenses on a light-emission side of the light source. The shutter device may be provided between the pair of fly's eye lenses.

In addition, a projection type video display according to these configurations may comprise a temperature sensor for detecting a temperature of the light valve. The cooling control means may control cooling power of the cooling means on the basis of an output of the temperature sensor. In addition, in a projection type video display according to these configurations, a heat absorbing medium from the cooling means may be guided to the shutter device in a state where the shutter device is closed. Or, in a state where the shutter device is closed, power supplied to the cooling means may be suspended or decreased.

Furthermore, in a projection type video display according to these configurations, the cooling control means may control the cooling means so as to decrease the cooling power for the light valve after a lapse of predetermined time period from a moment when the shutter device becomes a closing state. In addition, a projection type video display according to these configurations may comprise a second cooling means for air-cooling or liquid-cooling the light source. The cooling control means may control the second cooling means so as to increase cooling power for the light source in a state where the shutter device is closed.

The present invention has an effect such as restraining the excessive cooling caused by closing the shutter device in the configuration in which the light valve is cooled so as to prevent decrease in durability of the light valve.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a liquid crystal projector according to an embodiment of the present invention will be described with reference to FIG. 1 to FIG. 4.

Figure 1:
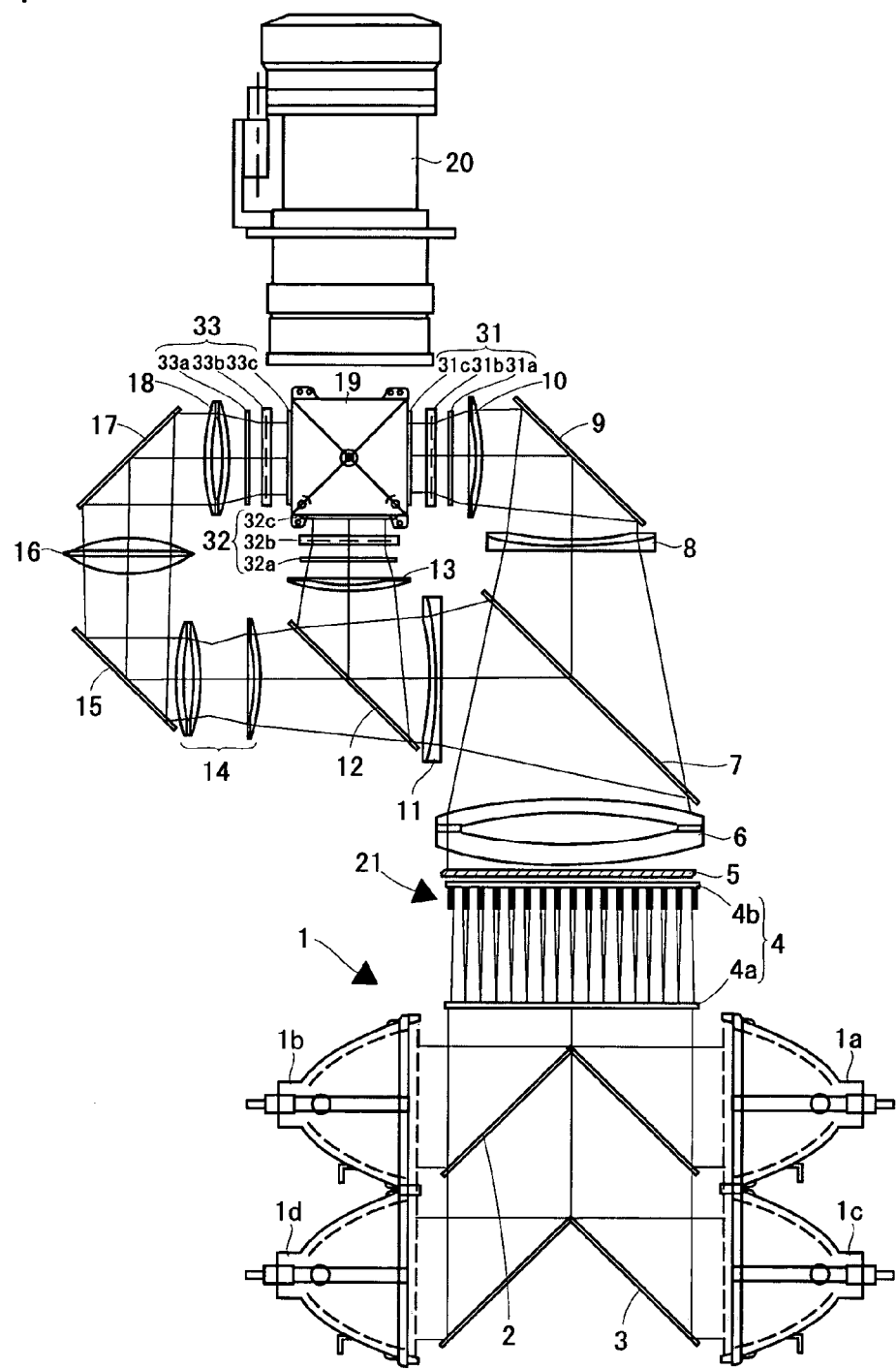
FIG. 1 is a structural view showing an optical system of a liquid crystal projector according to an embodiment of the present invention.

FIG. 1 is a diagram showing a four-lamp and three-panel liquid crystal projector according to this embodiment. An illuminating device 1 is formed of four lamps 1a, 1b, 1c, and 1d, mirrors 2 arranged between the lamps 1a and 1b, and mirrors 3 arranged between the lamps 1c and 1d. Each lamp is formed of an ultra-high pressure mercury lamp, a metal halide lamp, a xenon lamp, and others. Irradiating light of the lamp is emitted after being collimated by a parabolic reflector and guided to an integrator lens 4.

The integrator lens 4 is structured of a pair of fly's eye lenses 4a, 4b. Each pair of lenses guides light emitted from the illuminating device 1 onto an entire surface of a liquid crystal display panel described later. As a result, partial non-uniformity of luminance existing in the illuminating device 1 is evened off, and difference between light amount at a screen center and that at a screen perimeter is reduced. Light which passes through the integrator lens 4 is guided to a first dichroic mirror 7 via a polarization conversion system 5 and a condenser lens 6.

The polarization conversion system 5 is structured of a polarization beam splitter array (hereinafter, referred to as a PBS array). The PBS array is provided with a polarized light separating surface and a retardation plate (½ λ plate). Each polarized light separating surface of the PBS array transmits P-polarized light, for example, out of light from the integrator lens 4, and changes an optical path of S-polarized light by 90 degrees. The S-polarized light having the optical path changed is reflected by an adjacent polarized light separating surface, and given off as it is. On the other hand, the P-polarized light that passes through the polarized light separating surface is converted into the S-polarized light by the retardation plate provided on a front side (light-exit side) of the polarized light separating surface, and given off therefrom. That is, in this case, approximately all the light is converted into the S-polarized light.

The first dichroic mirror 7 transmits light in a red wavelength band, and reflects light in a cyan (green+blue) wavelength band. The light in a red wavelength band that passes through the first dichroic mirror 7 is reflected by a reflection mirror 9 via a concave lens 8, and has an optical path changed. The light in a red wavelength band reflected by the reflection mirror 9, via a lens 10, is guided to a transmission type liquid crystal display panel for light in red 31 and optically modulated as a result of passing therethrough. On the other hand, the light in a cyan wavelength band reflected by the first dichroic mirror 7 is guided to a second dichroic mirror 12, via the concave lens 11.

The second dichroic mirror 12 transmits light in a blue wavelength band, and reflects light in a green wavelength band. The light in a green wavelength band reflected by the second dichroic mirror 12, via a lens 13, is guided to a transmission type liquid crystal display panel for light in green 32, and optically modulated as a result of passing therethrough. In addition, the light in a blue wavelength band that passes through the second dichroic mirror 12, via relay lenses 14, a reflection mirror 15, relay lenses 16, a reflection mirror 17, and relay lenses 18, is guided to a transmission type liquid crystal display panel for light in blue 33, and optically modulated as a result of passing therethrough.

Each liquid crystal display panel 31, 32, and 33 is formed of being provided with light-incidence-side polarizers 31a, 32a, and 33a, panel portions 31b, 32b, and 33b formed by sealing a liquid crystal between one pair of glass plates (in which a pixel electrode and an alignment film are formed), and light-exit-side polarizers 31c, 32c, and 33c.

Each modulated light (image light of respective colors) modulated by passing through the liquid crystal display panels 31, 32, and 33 is combined by a cross dichroic prism 19, and rendered full-color image light. The full-color image light is projected by a projection lens 20, and displayed on a screen not shown.

Figure 2A:
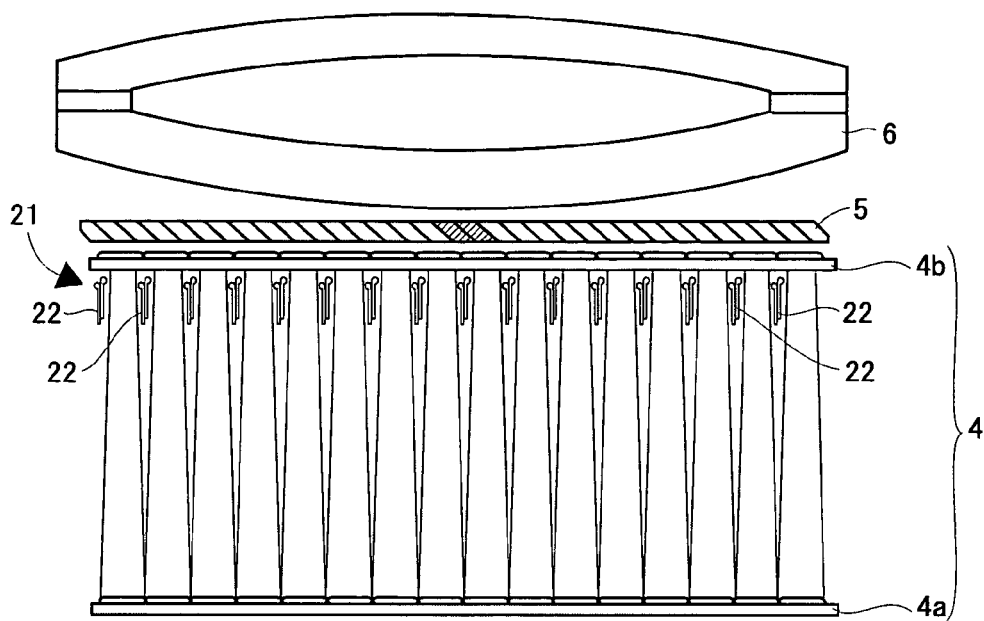
FIG. 2A is a plan view showing a detail of a shutter device.
Figure 2B:
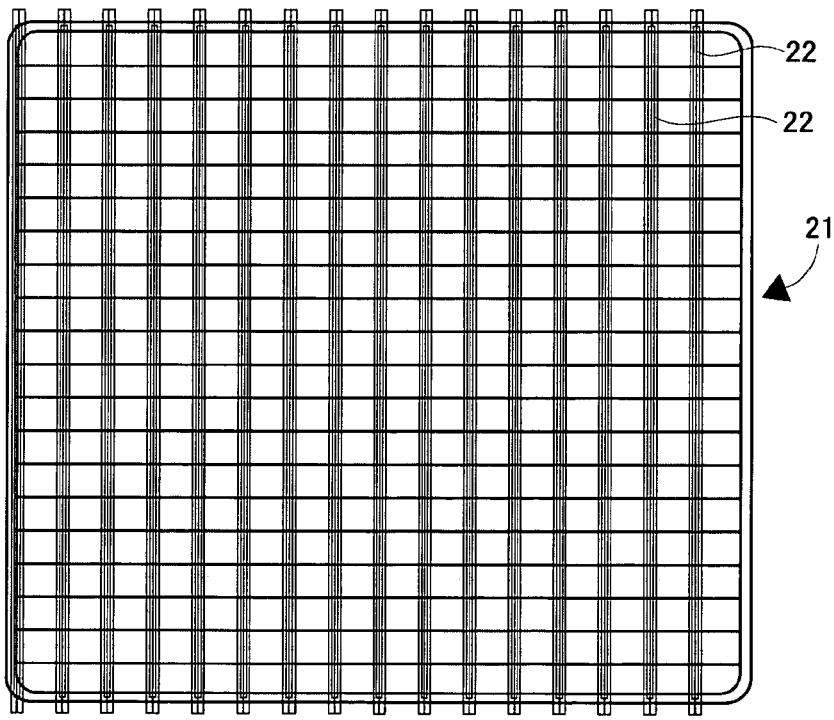
FIG. 2B is a front view showing a detail of a shutter device.

A shutter device 21, as shown in FIG. 2, is formed of a plurality of shutter parts 22. Each shutter part 22 is provided in a position close to the fly's eye lens 4b positioned on a side of the polarization conversion system 5 and yet, not blocking a passage of effective illuminating light. Each shutter part 22 is formed of a shaft arranged vertically and a shading plate fixed firmly to the shaft. The shading plate is formed by applying a light absorbing material in black to a member made of resin or metal so as to absorb received light. The shading plate is turned by turning the shaft by 90 degrees, so that it is possible to switch between a state where illuminating light is blocked (referred to as a closing state of the shutter device) and a state where illuminating light passes through (referred to as an opening state of the shutter device).

With the shutter device 21 according to the above-described configuration, the illuminating light is blocked between the pair of fly's eye lenses 4a, 4b. As a result, it is possible to prevent light from being incident on the liquid crystal display panels 31, 32, and 33 in a case where an image projection is temporarily stopped. The shutter parts 22 in the shutter device 21 are driven by an actuator such as a solenoid, and others. Driving information (opening and closing information) of the shutter parts 22 are notified by a detecting portion 47 (see FIG. 3) to a system control circuit 40 described later. The detecting portion 47 is formed of a switch connected to the solenoid, a proximity switch arranged close to the solenoid, a switch provided in a mechanism for transmitting a movement of the solenoid to the shutter parts 22, and others. In addition, if the system control circuit 40 outputs opening and closing signals to the solenoid, the system control circuit 40 can also function as the detecting portion 47.

Figure 3:
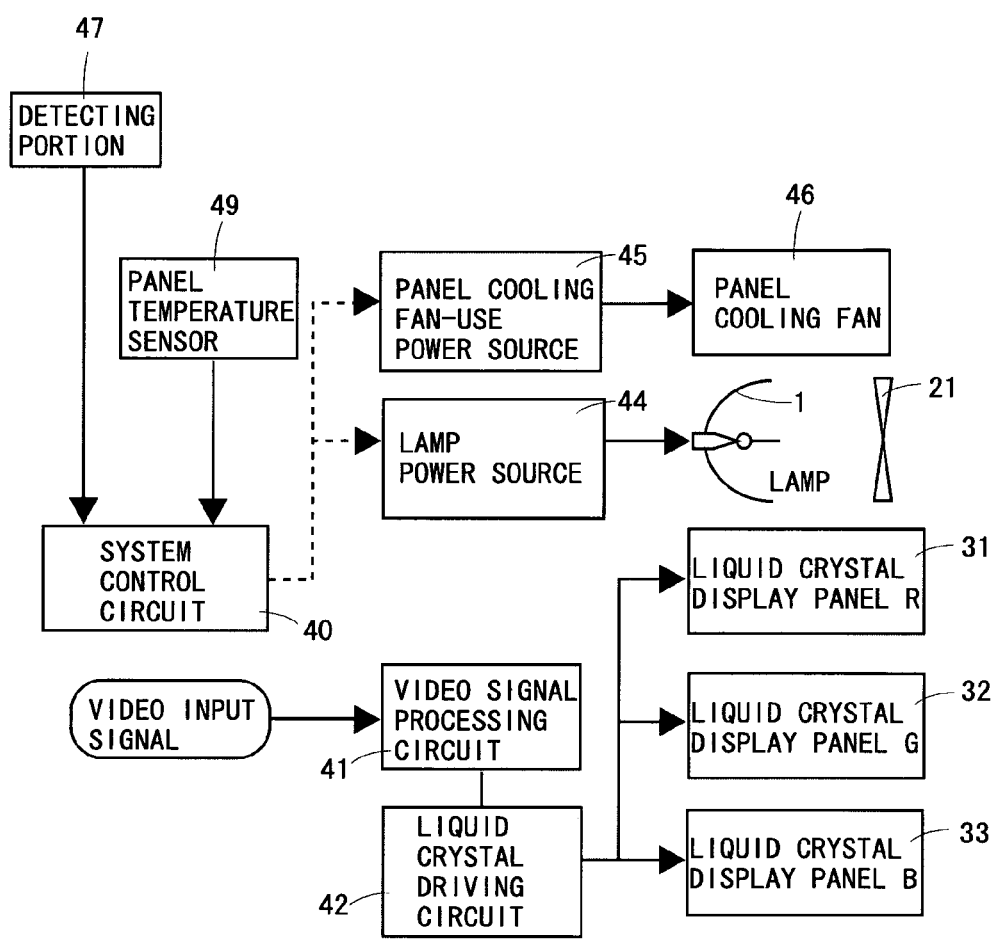
FIG. 3 is a block diagram showing a lamp control system and a cooling fan control system of the liquid crystal projector.

FIG. 3 is a block diagram showing an image processing system, a lamp control system, and a panel cooling fan control system, and the like, of the projection type video display. A video signal processing circuit 41 inputs a video signal and subjects the input signal to a frequency conversion (conversion of the number of scanning lines), a gamma correction process in view of "applied voltage—light transmission characteristic of the liquid crystal display panel", and other processes, and applies the corrected video signal (image data) to a liquid crystal driving circuit 42. The liquid crystal driving circuit 42 drives the liquid crystal display panels 31, 32, and 33 on the basis of the corrected video signal. The system control circuit 40 controls operations of a lamp power source 44, a panel cooling fan-use power source 45, and others. A detail of the system control circuit 40 will be described later. The lamp power source 44 is a circuit for starting and stopping power supply to the lamp and adjusting power supplied thereto (adjusting light amount). The lamp power source 44 is utilized for a control of light amount of the lamp according to a luminance signal of an input video signal (control such as increasing light amount of the lamp when the luminance signal is high, for example). The panel cooling fan-use power source 45 is a circuit for starting and suspending power supply to a panel cooling fan 46 and adjusting power supplied thereto. A panel temperature sensor 49 measures neighborhood temperature of the liquid crystal display panels, and applies the measured temperature to the system control circuit 40. It is noted that a cooling system and a temperature detecting system for the lamp may certainly be provided. Hereinafter, processes of the system control circuit 40 according to the present invention will be described.

(1) The system control circuit 40 instructs the panel cooling fan-use power source 45 to decrease a fan rotation speed, when receiving information indicating that the shutter device 21 is in the closing state from the detecting portion 47. After receiving this instruction, the panel cooling fan-use power source 45 decreases power supplied to the panel cooling fan 46 (a fan motor). Needless to say, the system control circuit 40 instructs the panel cooling fan-use power source 45 to restore the amount of power supplied to the panel cooling fan 46, when receiving information indicating that the shutter device 21 returned to the opening state from the detecting portion 47. It is noted that the system control circuit 40 may instruct to suspend the fan rotation (suspend power supply) instead of instructing to decrease the fan rotation speed. Furthermore, the system control circuit 40 may instruct to decrease the fan rotation speed or to suspend the fan rotation, not concurrently with a moment when the shutter device 21 is closed, but after a certain time lag, that is, after a predetermined time period (for example, after three seconds) from a moment when the shutter device 21 was closed. In addition, the system control circuit 40 may increase cooling power in the cooling system for the lamp, when receiving information indicating that the shutter device 21 is in the closing state from the detecting portion 47.

(2) The system control circuit 40 obtains information on detected temperature from the panel temperature sensor 49. The system control circuit 40 instructs the panel cooling fan-use power source 45 to increase power supplied to the panel cooling fan 46 when determining that the temperature reached or exceeded an upper temperature limit. This control is performed in order to keep the temperature of the liquid crystal display panels within a specified range, regardless of opening and closing of the shutter device 21. As described above, the light is not guided to the liquid crystal display panels when the shutter device 21 is closed. Therefore, the temperature of the liquid crystal display panels falls, and the fan rotation speed is decreased on the basis of the detected temperature by the panel temperature sensor 49. The fan rotation speed control according to the closing state of the shutter described in (1) has, so to speak, a meaning of positively preventing an excessive cooling of the panels instead of waiting a fall in the temperature of the panels.

Incidentally, when the shutter device 21 is closed, a sharp rise in temperature is expected as a result the shutter device 21 receiving light from the lamp. A lamp cooling fan is generally provided in the vicinity of the lamp, and the shutter device 21 is positioned in the vicinity of the lamp. Therefore, the shutter device 21 receives cooling air from the lamp cooling fan in some degree, so that the rise in temperature is restrained to some extent. However, it is conceivable that the shutter device 21 is not cooled sufficiently, if a rotation speed of the lamp cooling fan is not changed despite very high temperature in the shutter device 21. On the other hand, when the shutter device 21 is closed, cooling by the panel cooling fan 46 is almost unnecessary.

Figure 4:
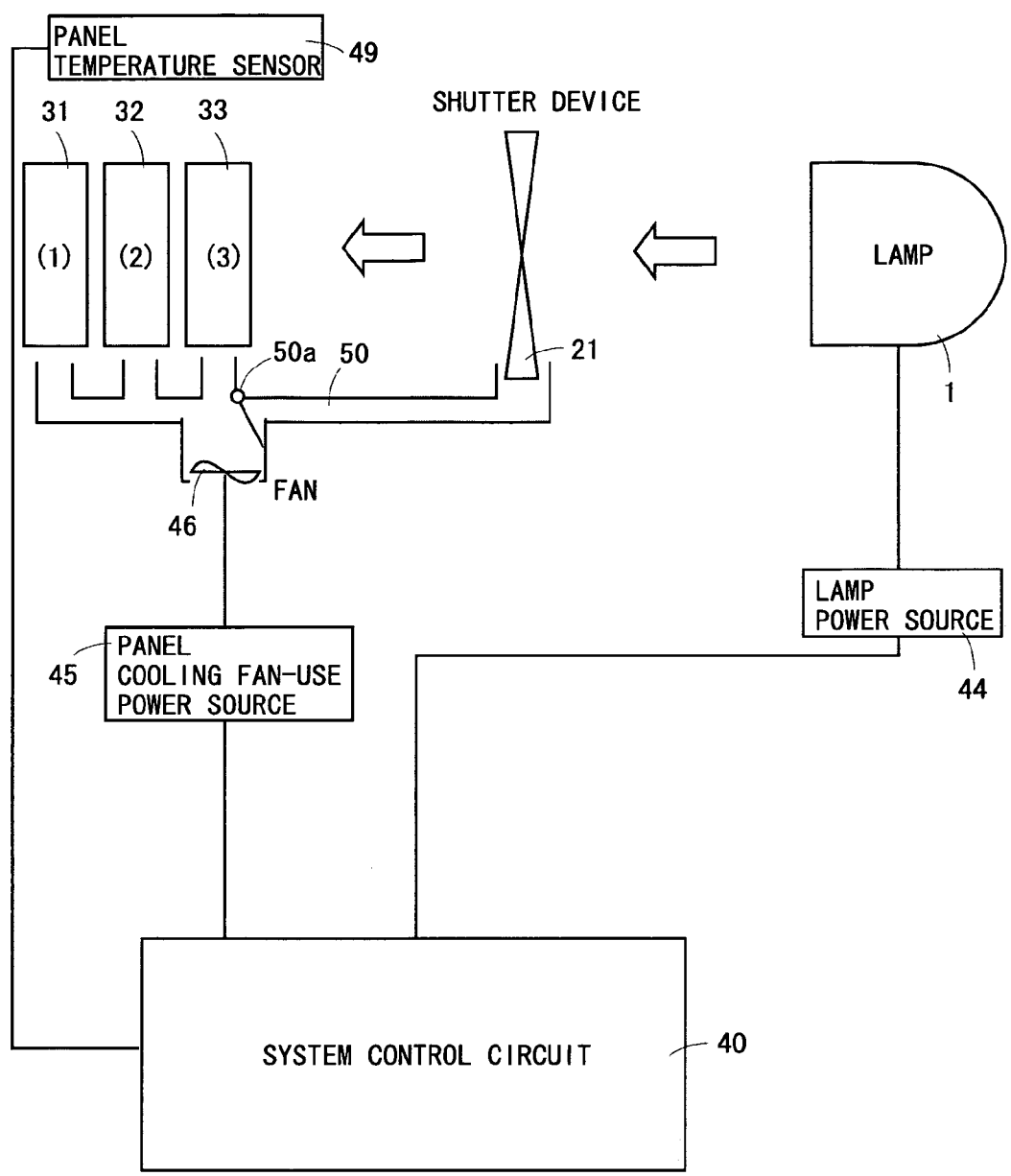
FIG. 4 is a block diagram showing another example of a lamp control system and a cooling fan control system of the liquid crystal projector.

Accordingly, as shown in FIG. 4, a duct 50 for guiding cooling air from the panel cooling fan 46 to the shutter device 21 may be provided. In addition, a switching valve 50a for switching flow paths of the cooling air is provided in the duct 50. The switching valve 50a is driven by an actuator (for example, a solenoid and others) controlled by the system control circuit 40. The system control circuit 40 operates the switching valve 50a, when receiving information indicating that the shutter device 21 is in the closing state from the detecting portion 47. As a result of this, the cooling air from the panel cooling fan 46 is guided to the shutter device 21. At this time, the system control circuit 40 need not instruct the panel cooling fan-use power source 45 to decrease the fan rotation speed. Rather, the system control circuit 40 may instruct to increase the fan rotation speed. Even if the fan rotation speed of the panel cooling fan 46 is increased when the shutter is closed, the cooling air is guided to a side of the shutter device 21, so that cooling power for the liquid crystal display panel is decreased.

It is noted that, the three-panel liquid crystal projector using the liquid crystal display panels is shown in the above-described embodiment. However, it is possible to apply the present invention to a projection type video display provided with another image light generating system. Furthermore, although a configuration in which the shutter device is provided between a pair of fly's eye lenses 4a, 4b is shown, it is not always the case. In addition, although an air-cooling method is shown as the cooling means, a liquid-cooling method can also be adopted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display that optically modulates light emitted from a light source by a light valve and projects image light, comprising:
   a shutter device that opens and closes mechanically, and blocks the light by absorbing the light in a closing state;
   a shutter information output portion for outputting opening and closing information of the shutter device;
   a cooling means for air-cooling or liquid-cooling the light valve;
   a cooling control means for controlling the cooling means so as to decrease cooling power for the light valve, when receiving information indicating that the shutter device is in a closing state from the shutter information output portion; and
   an integrator lens formed of a pair of fly's eye lenses on a light-emission side of the light source, wherein the shutter device is provided between the pair of fly's eye lenses.

2. A projection type video display according to claim 1, comprising a temperature sensor for detecting a temperature of the light valve, wherein the cooling control means controls cooling power of the cooling means on the basis of an output of the temperature sensor.

3. A projection type video display according to claim 1, wherein a heat absorbing medium from the cooling means is guided to the shutter device in a state where the shutter device is closed.

4. A projection type video display according to claim 1, wherein power supplied to the cooling means is suspended or decreased in a state where the shutter device is closed.

5. A projection type video display according to claim 1, wherein the cooling control means controls the cooling means so as to decrease the cooling power for the light valve after a lapse of predetermined time period from a moment when the shutter device becomes a closing state.

6. A projection type video display according to claim 1, comprising a second cooling means for air-cooling or liquid-cooling the light source, wherein the cooling control means controls the second cooling means so as to increase cooling power for the light source in a state where the shutter device is closed.

* * * * *